(12) United States Patent
Ji et al.

(10) Patent No.: US 12,483,937 B2
(45) Date of Patent: Nov. 25, 2025

(54) RESOURCE PROCESSING METHOD, RESOURCE PROCESSING APPARATUS, AND TERMINAL

(71) Applicant: VIVO MOBILE COMMUNICATION CO., LTD., Guangdong (CN)

(72) Inventors: Zichao Ji, Guangdong (CN); Shuyan Peng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 424 days.

(21) Appl. No.: 17/993,416

(22) Filed: Nov. 23, 2022

(65) Prior Publication Data

US 2023/0092090 A1    Mar. 23, 2023

Related U.S. Application Data

(63) Continuation of application No. PCT/CN2021/095120, filed on May 21, 2021.

(30) Foreign Application Priority Data

May 26, 2020  (CN) .......................... 202010454315.9

(51) Int. Cl.
*H04W 28/26* (2009.01)
*H04W 72/02* (2009.01)
*H04W 72/12* (2023.01)

(52) U.S. Cl.
CPC ........... *H04W 28/26* (2013.01); *H04W 72/02* (2013.01); *H04W 72/12* (2013.01)

(58) Field of Classification Search
CPC ..... H04W 28/26; H04W 72/02; H04W 72/12; H04W 72/0446; H04W 16/10;
(Continued)

(56) References Cited

U.S. PATENT DOCUMENTS

2018/0227882 A1*  8/2018  Freda ................... H04W 76/14
2020/0214002 A1   7/2020  Lee et al.
(Continued)

FOREIGN PATENT DOCUMENTS

| CN | 110958696 A | 4/2020 |
| CN | 112822777 A | 5/2021 |
| WO | 2019045464 A1 | 3/2019 |

OTHER PUBLICATIONS

Vivo, "Remaining issues on mode 2 resource allocation mechanism", R1-2001661, 3GPP TSG-RAN WG1 Meeting #100bis e-Meeting, Apr. 20-30, 2020. (Year: 2020).*

(Continued)

*Primary Examiner* — Khoa Huynh
(74) *Attorney, Agent, or Firm* — BROOKS KUSHMAN P.C.

(57) ABSTRACT

A resource processing method, a resource processing apparatus, and a terminal, and pertains to the field of communications technologies. The method includes: performing re-evaluation on a target resource at a first time point, where the target resource includes at least one of the following: a first reserved resource corresponding to a second time point; a second reserved resource indicated by first resource reservation information; and a third reserved resource indicated by the first resource reservation information; where the first resource reservation information is to be sent at the second time point, the first time point is before the second time point, the second reserved resource is an aperiodic resource, and the third reserved resource is a resource within a resource period of a periodic resource.

17 Claims, 3 Drawing Sheets

Perform re-evaluation on a target resource at a first time point — 101

(58) Field of Classification Search
CPC ..... H04W 24/02; H04W 72/53; H04W 72/25; H04W 92/18
See application file for complete search history.

(56) References Cited

U.S. PATENT DOCUMENTS

2021/0212053 A1  7/2021  Ji
2022/0272709 A1  8/2022  Jiang

OTHER PUBLICATIONS

International Search Report and Written Opinion for Application No. PCT /CN2021/095120, dated Aug. 12, 2021, 10 Pages.
Vivo, "Remaining issues on mode 2 resource allocation mechanism", 3GPP TSG RAN WG1 #100, Feb. 2020, e-Meeting ,R1-2000317, 7 Pages.
Vivo, "Remaining issues on mode 2 resource allocation mechanism", 3GPP TSG-RAN WG1 Meeting #100bis, e-Meeting, Apr. 2020, R1-2001661, 8 Pages.
Vivo, "Remaining issues on mode 2 resource allocation mechanism", 3GPP TSG-RAN WG1 Meeting #102-e, e-Meeting, Aug. 2020, R1-2005340, 11 Pages.
Extended European Search Report for Application No. 21814429.3, dated Sep. 29, 2023, 10 Pages.
RAN1 "Reply LS on TX resource (re-)selection and MAC related agreements" 3GPP TSG-RAN WG1 Meeting #99, Reno, USA, Nov. 2019, R1-1913695, 2 Pages.
First Office Action for Japanese Application No. 2022-572434, dated Aug. 4, 2023, 3 Pages.
MediaTek Inc. "On sidelink mode-2 resource allocation" 3GPP TSG RAN WG1 Meeting #100, e-Meeting, Feb. 2020, R1-2000447, 7 Pages.
Huawei, HiSilicon "Remaining details of sidelink resource allocation mode 2" 3GPP TSG RAN WG1 Meeting #100bis-e, E-meeting, Apr. 2020, R1-2001552, 22 Pages.
Qualcomm Incorporated "Sidelink Resource Allocation Mechanism for NR V2X" 3GPP TSG RAN WG1 Meeting #100bis-e, Apr. 2020, R1-2002539, 22 Pages.
Vivo "Remaining issues on mode 2 resource allocation mechanism" 3GPP TSG-RAN WG1 Meeting #101, e-Meeting, May 2020, R1-2003379, 7 Pages.
Korean Office Action for Korean Patent Application No. 10-2022-7044960 dated Mar. 17, 2025. 11 pages.
Intel Corporation. FL summary#2 of critical issues for 7.2.4.2.2—V2X Mode 2. 3GPP TSG RAN WG1 Meeting #101-E. R1-2004715. Online. May-Jun. 2020. 38 pages.

\* cited by examiner

RESOURCE PROCESSING METHOD, RESOURCE PROCESSING APPARATUS, AND TERMINAL

CROSS-REFERENCE TO RELATED APPLICATIONS

This application is a continuation of PCT International Application No. PCT/CN2021/095120 filed on May 21, 2021, which claims priority to Chinese Patent Application No. 202010454315.9, filed on May 26, 2020, which are incorporated herein by reference in their entireties.

TECHNICAL FIELD

This application relates to the field of communications technologies, and specifically, to a resource processing method, a resource processing apparatus, and a terminal.

BACKGROUND

Resource allocation for NR (New Radio) sidelink (SL) includes at least two modes: mode 1 and mode 2. In mode 1, a control node allocates a transmission resource for a terminal, and in mode 2, the terminal autonomously selects a transmission resource.

In the resource allocation mode 2, a preemption mechanism is supported. Based on an SL preemption operation, if a resource selected or reserved by the terminal is preempted by another terminal, resource reselection needs to be performed so that the terminal whose resource is preempted transmits a transport block (TB) on a reselected resource, to avoid a problem of transmission collision or interference. However, in the prior art, there is no solution for how to determine whether the resource selected or reserved by the terminal is preempted, that is, how to re-evaluate the resource selected or reserved by the terminal.

SUMMARY

According to a first aspect, a resource processing method is provided, applied to a terminal, and the method includes:
performing re-evaluation on a target resource at a first time point, where the target resource includes at least one of the following:
a first reserved resource corresponding to a second time point;
a second reserved resource indicated by first resource reservation information; and
a third reserved resource indicated by the first resource reservation information; where
the first resource reservation information is to be sent at the second time point, the first time point is before the second time point, the second reserved resource is an aperiodic resource, and the third reserved resource is a resource within a resource period of a periodic resource.

According to a second aspect, a resource processing apparatus is provided, applied to a terminal, and the resource processing apparatus includes:
an evaluation module, configured to perform re-evaluation on a target resource at a first time point, where the target resource includes at least one of the following:
a first reserved resource corresponding to a second time point;
a second reserved resource indicated by first resource reservation information; and
a third reserved resource indicated by the first resource reservation information; where
the first resource reservation information is to be sent at the second time point, the first time point is before the second time point, the second reserved resource is an aperiodic resource, and the third reserved resource is a resource within a resource period of a periodic resource.

According to a third aspect, a terminal is provided, where the terminal includes a processor, a memory, and a program or an instruction stored in the memory and capable of running on the processor, and when the program or the instruction is executed by the processor, the steps of the method according to the first aspect are implemented.

According to a fourth aspect, a computer-readable storage medium is provided, where a program or an instruction is stored in the computer-readable storage medium, and when the program or the instruction is executed by a processor, the steps of the method according to the first aspect are implemented.

According to a fifth aspect, a chip is provided, where the chip includes a processor and a communications interface, the communications interface is coupled to the processor, and the processor is configured to run a program or an instruction of a network-side device to implement the method according to the first aspect.

DETAILED DESCRIPTION

Figure 1:
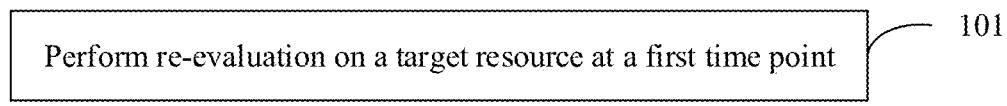
FIG. 1 is a flowchart of a resource processing method according to an embodiment of the present invention.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects is not limited, for example, a first object may be one or multiple. In addition, "and/or" in this specification and claims indicates at least one of connected objects, and the symbol "/" generally indicates that the associated objects are in an "or" relationship.

It should be noted that technologies described in the embodiments of this application are not limited to a long term evolution (LTE)/LTE-advanced LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

In the embodiments of this application, the terminal may also be referred to as a terminal device or user equipment (UE), and the terminal may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or a vehicle user equipment (VUE), or a pedestrian user equipment (PUE). The wearable device includes: a wrist band, earphones, glasses, or the like. It should be noted that a specific type of the terminal is not limited in the embodiments of this application.

The control node may include, but is not limited to, any one of the following: a network side device, relay UE, a group header UE, and the like. The network-side device may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term.

For ease of understanding, the following describes some content included in the embodiments of this application.

I. Sidelink (SL) Resource Preemption (Resource Pre-Emption)

Resource allocation for NR sidelink includes at least two modes: mode 1 and mode 2. For mode 1, a control node may allocate a transmission resource for UE, and for mode 2, the UE autonomously selects a transmission resource.

In the resource allocation mode 2, a resource preemption mechanism is supported, and the mechanism is briefly described as follows: a resource that has been reserved or selected by one UE overlaps (partially overlaps) a resource reserved or selected by another UE with a higher-priority service; and if a measured value of SL reference signal received power (RSRP) of the UE on a related resource is greater than an associated SL-RSRP (associated SL-RSRP) threshold, the UE may trigger resource reselection. The service priority and the SL-RSRP threshold are determined based on a transport block (TB) transmitted on the resource.

In order to determine whether a reserved or selected resource is preempted, the UE performs re-evaluation for resource selection at least at a time point m−T3, where the time point m represents a time point at which the resource is located or is used for indicating a time point at which resource reservation information of the resource is transmitted, and T3 includes at least a processing duration for resource selection of the UE. The resource may be: a physical sidelink control channel (PSCCH), a physical sidelink shared channel (PSSCH) resource, or the like.

II. Sidelink Resource Reservation

The UE may perform resource reservation (reservation includes periodic reservation and aperiodic reservation) of resources allocated to the UE, and a reserved resource is to be used for subsequent PSCCH or PSSCH transmission.

The aperiodic reservation may be implemented by using a time resource assignment field in sidelink control information (SCI), and the reserved resource may be used at least for transmission of a same TB.

The periodic reservation may be implemented by using a resource reservation period field in the SCI, and a periodic resource reserved in a current period may be used at least for transmission of a next TB.

The following describes in detail a resource processing method provided in the embodiments of this application by using specific embodiments and application scenarios thereof with reference to the accompanying drawings.

Referring to FIG. 1, FIG. 1 is a flowchart of the resource processing method according to an embodiment of this application. The resource processing method in this embodiment of this application may be applied to a terminal.

As shown in FIG. 1, the resource processing method may include the following steps.

Step 101: Perform re-evaluation on a target resource at a first time point.

That is, it is determined at the first time point whether the target resource reserved by the terminal is preempted.

In this embodiment of this application, the target resource may include at least one of the following:

a first reserved resource corresponding to a second time point;

a second reserved resource indicated by first resource reservation information; and a third reserved resource indicated by the first resource reservation information; where the first resource reservation information is to be sent at the second time point, the first time point is before the second time point, the second reserved resource is an aperiodic resource, and the third reserved resource is a resource within a resource period of a periodic resource.

Further, an interval between the first time point and the second time point may be greater than or equal to a processing duration of resource reselection, so that in a case that an evaluation result of the re-evaluation is resource reselection being required for the target resource, that is, the target resource has been preempted, the terminal may perform resource reselection at or before the second time point to avoid a problem of transmission collision or interference, thereby improving reliability of transmission. Certainly, in another implementation, the interval between the first time point and the second time point may be greater than a threshold, where the threshold may be specified by a protocol, configured by a control node, or preconfigured by the terminal, and the threshold may be specifically configured based on an actual requirement, which is not limited in this embodiment of this application.

During specific implementation, the second reserved resource may be reserved by using a time resource assignment field, and the third reserved resource may be reserved by using a resource reservation period field. Further, the third reserved resource may include part or all of resources within next one or more resource periods of a periodic resource. It should be noted that in this embodiment of this application, the next one or more resource periods may be understood as one or more resource periods following a current resource period, and the current resource period may be a resource period in which the first reserved resource is located. The one periodic resource may be obtained by shifting a resource in time domain, and a time domain step of the shifting is a length of one resource period. One resource period of the periodic resource may include one or more periodic resources.

The first reserved resource corresponding to the second time point may be understood as the second time point being a time point at which the first reserved resource is located. Optionally, the first reserved resource is a periodic resource, and the first reserved resource may be one resource within the resource period of the periodic resource.

During implementation, for the second reserved resource and the third reserved resource that are indicated by the first resource reservation information, in a first implementation, the terminal may perform re-evaluation only on the second reserved resource, and in a second implementation, the terminal may perform evaluation on both the second reserved resource and the third reserved resource.

According to the resource processing method provided in this embodiment of this application, the terminal may perform re-evaluation on the target resource at the first time point, where the target resource includes at least one of: the first reserved resource corresponding to the second time point, the second reserved resource indicated by the first resource reservation information, and the third reserved resource indicated by the first resource reservation information, where the first resource reservation information is to be sent at the second time point, the first time point is before the second time point, the second reserved resource is an aperiodic resource, and the third reserved resource is a resource within the resource period of the periodic resource. It can be learned that this embodiment of this application can implement re-evaluation on a resource selected or reserved by the terminal to avoid the problem of transmission collision or interference, thereby improving reliability of transmission.

The third reserved resource in this embodiment of this application is described below.

Optionally, a resource period of the third reserved resource is less than or equal to a first threshold, and the first threshold is specified by the protocol, configured by the control node, or preconfigured by the terminal.

In this optional implementation, whether the terminal performs re-evaluation on a periodically reserved resource indicated by the first resource reservation information may depend on: whether a resource period of the periodically reserved resource indicated by the first resource reservation information is less than the first threshold. Specifically, the terminal may perform re-evaluation on a periodic resource whose resource period is less than the first threshold, and the terminal may not perform re-evaluation on a periodic resource whose resource period is greater than or equal to the first threshold. In this way, the terminal may clearly know whether to perform re-evaluation on the third reserved resource, thereby improving reliability of transmission.

In another optional implementation, whether the terminal performs re-evaluation on a periodically reserved resource indicated by the first resource reservation information may depend on: whether a resource period of the periodically reserved resource indicated by the first resource reservation information is less than or equal to the first threshold. Specifically, the terminal may perform re-evaluation on a periodic resource whose resource period is less than or equal to the first threshold, and the terminal may not perform re-evaluation on a periodic resource whose resource period is greater than the first threshold. In this way, the terminal may clearly know whether to perform re-evaluation on the third reserved resource, thereby improving reliability of transmission.

Optionally, it is assumed that a characteristic of a first transport block TB to be transmitted on the third reserved resource is the same as a characteristic of a second TB to be transmitted on the first reserved resource; or it is assumed that the characteristic of the first TB is predetermined by the protocol, configured by the control node, or preconfigured by the terminal.

In this optional implementation, the terminal may determine whether to perform re-evaluation on the third reserved resource based on any one of the foregoing assumptions. During specific implementation, if any one of the foregoing assumptions holds true, the terminal may perform re-evaluation on the third reserved resource; otherwise, the terminal may not perform re-evaluation on the third reserved resource. In this way, the terminal may clearly know whether to perform re-evaluation on the third reserved resource, thereby improving reliability of transmission.

During implementation, the characteristics of the foregoing TB may include part or all of characteristics of the TB. Optionally, the characteristic of the TB includes at least one of the following: a resource mapping priority of the TB and a packet delay budget (PDB) of the TB. Further, the resource mapping priority of the TB may include at least one of the following: a PSSCH mapping priority of the TB, and a PSCCH mapping priority of the TB. Specifically, when a TB is to be transmitted on a PSSCH, a priority indicated by an associated PSCCH/SCI of the PSSCH is a resource mapping priority of the TB.

For example, in a case that the characteristic of the first TB is predetermined by the protocol, configured by the control node, or preconfigured by the terminal, it may be assumed that the PSSCH or PSCCH mapping priority of the first TB is a maximum value, a minimum value, a configured value, or a preconfigured value; or, it is assumed that a PDB characteristic of the first TB is a fixed value, a configured value, or a preconfigured value.

The following describes a case that the target resource includes the first reserved resource.

Optionally, in a case that the target resource includes the first reserved resource, the performing re-evaluation on a target resource at a first time point includes:

performing re-evaluation on the target resource at the first time point in a case that a first condition is satisfied, where the first condition being satisfied includes any one of the following:

(a) that the terminal has a to-be-transmitted TB at the first time point;

(b) that the terminal has a to-be-transmitted TB before the first time point; and (c) that the terminal has no to-be-transmitted TB on the first reserved resource; where the to-be-transmitted TB is a TB configured to be transmitted on the first reserved resource.

In this optional implementation, the terminal may perform re-evaluation on the first reserved resource at the first time point in two scenarios: In scenario 1, in a case that the first condition being satisfied includes (a) and (b), re-evaluation is performed on the first reserved resource at the first time point; and in scenario 2, in a case that the first condition being satisfied includes (c), re-evaluation is performed on the first reserved resource at the first time point.

For scenario 1, if the terminal has a to-be-transmitted TB at a time no later than the first time point, that is, the to-be-transmitted TB arrives at the time no later than the first time point, the terminal may perform re-evaluation on the first reserved resource at the first time point.

For scenario 2, optionally, in a case that the first condition being satisfied includes that the terminal has no to-be-transmitted TB on the first reserved resource:
  it is assumed that a characteristic of a third TB to be transmitted on the first reserved resource is the same as a characteristic of a fourth TB; or it is assumed that the characteristic of the third TB is specified by the protocol, configured by the control node, or preconfigured by the terminal; where
  the fourth TB satisfies at least one of the following: the fourth TB and the third TB belong to a same sidelink process (SL Process), and the fourth TB is a TB prior to the third TB.

During implementation, the characteristics of the foregoing TB may include part or all of the characteristics of the TB. For details, refer to the foregoing description about the characteristics of the TB, which are not repeated herein.

During implementation, the fourth TB may be a TB transmitted prior to the TB. Further, the fourth TB and the third TB may belong to a same sidelink process, or the fourth TB and the third TB may belong to different sidelink processes. In a case that the fourth TB and the third TB may belong to the same sidelink process, the fourth TB may be one of n TBs transmitted prior to the third TB, where n is a positive integer.

In scenario 2, the terminal may determine whether to perform re-evaluation on the first reserved resource based on any one of the foregoing assumptions. During specific implementation, if any one of the foregoing assumptions holds true, the terminal may perform re-evaluation on the first reserved resource; otherwise, the terminal may not perform re-evaluation on the first reserved resource.

In this embodiment of this application, after the terminal performs re-evaluation on the target resource, for a resource that has not been preempted, the terminal may perform TB transmission on the resource; and for a resource that has been preempted, the terminal may perform a corresponding operation, so as to improve reliability of transmission. The following provides specific descriptions.

In implementation 1, optionally, after the performing re-evaluation on a target resource at a first time point, the method further includes:
  performing a first operation in a case that an evaluation result of the re-evaluation is resource reselection being required for the third reserved resource, where the first operation includes any one of the following:
  reselecting a periodic resource to which the third reserved resource belongs;
  reselecting all periodic resources included in a first sidelink process;
  prohibiting reservation of the third reserved resource in the first reserved resource; and
  releasing the first sidelink process; where
  the first sidelink process is a sidelink process to which the third reserved resource belongs.

In this implementation, the third reserved resource has been preempted, and the terminal may perform the first operation to avoid a problem of transmission collision or interference, thereby improving reliability of transmission.

In a scenario in which the periodic resource to which the third reserved resource belongs is reselected and all periodic resources included in the first sidelink process is reselected, the terminal performs resource reselection to implement TB transmission on a reselected resource obtained through reselection, so as to avoid a problem of transmission collision or interference, thereby improving reliability of transmission.

In a scenario in which reservation of the third reserved resource in the first reserved resource is prohibited, the resource reservation period field may be set to 0, so that the third reserved resource is not reserved in the first reserved resource to avoid a problem of transmission collision or interference, thereby improving reliability of transmission.

In a scenario in which the first sidelink process is released, the terminal may not execute the first sidelink process by using the third reserved resource because the first sidelink process has been released, so as to avoid a problem of transmission collision or interference, thereby improving reliability of transmission.

In implementation 2, optionally, after the performing re-evaluation on a target resource at a first time point, the method further includes:
  performing a second operation in a case that an evaluation result of the re-evaluation is resource reselection being required for the first reserved resource, where the second operation includes any one of the following:
  releasing the first reserved resource; and
  releasing a sidelink process to which the first reserved resource belongs.

In this implementation, the first reserved resource has been preempted, and the terminal may perform the second operation to avoid a problem of transmission collision or interference, thereby improving reliability of transmission.

In a scenario in which the first reserved resource is released, the terminal may not perform TB transmission on the first reserved resource, so as to avoid a problem of transmission collision or interference, thereby improving reliability of transmission.

In a scenario in which the sidelink process to which the first reserved resource belongs is released, the terminal may not execute the first sidelink process by using the first reserved resource, so as to avoid a problem of transmission collision or interference, thereby improving reliability of transmission.

In implementation 3, optionally, after the performing re-evaluation on a target resource at a first time point, the method further includes:
  in a case that an evaluation result of the re-evaluation is resource reselection being required for the target resource, performing resource re-selection to obtain a fourth reserved resource; and
  determining, according to a first rule, whether to perform periodic reservation of the fourth reserved resource, where the first rule includes at least one of the following:
  (1) whether to perform periodic reservation of a reselected resource is determined by the terminal; and
  (2) whether to perform periodic reservation of a reselected resource is determined based on a second condition, where in a case that the second condition is satisfied, periodic reservation of the reselected resource is performed, and the second condition being satisfied includes at least one of the following: that the number of resources of transmission resources in one resource period is less than or equal to a second threshold, where the second threshold is a maximum number of resources allowed in a resource period or a maximum number of transmissions allowed for one TB; and that a channel busy ratio (CBR) is less than a third threshold, where the third threshold is specified by the protocol, configured by the control node, or preconfigured by the terminal. Specifically, the number of the resources of the transmission resources in one resource period may be the number of resources of transmission resources in a next resource period.

Optionally, the maximum number of resources allowed in the resource period and the maximum number of transmissions allowed for one TB may be limited per resource pool or bandwidth part (BWP). In other words, the maximum number of resources allowed in the resource period and the maximum number of transmissions allowed for one TB may be a maximum number of resources allowed in the resource period and a maximum number of transmissions allowed for one TB in each pool or BWP.

During this implementation, the target resource has been preempted, and the terminal performs resource reselection to obtain the fourth reserved resource. During this implementation, the target resource may include one or more of the first reserved resource, the second reserved resource, and the third reserved resource.

During this implementation, after obtaining a reselected resource, that is, the fourth reserved resource, the terminal may determine whether to perform periodic reservation of the reselected resource according to the first rule.

In a scenario in which the first rule includes (1), the terminal may autonomously determine whether to perform periodic reservation of the reselected resource. If the terminal determines to perform periodic reservation of the selected resource, that is, periodic reservation being allowed, the terminal may perform periodic reservation of the fourth reserved resource; otherwise, the terminal may not perform periodic reservation of the fourth reserved resource.

In a scenario in which the first rule includes (2), in a case that the second condition is satisfied, the terminal may perform periodic reservation of the fourth reserved resource; otherwise, the terminal may not perform periodic reservation of the fourth reserved resource.

During implementation, if the number of resources of transmission resources in one resource period is less than or equal to the second threshold, the terminal may perform periodic reservation of the fourth reserved resource; otherwise, the terminal may not perform periodic reservation of the fourth reserved resource. If the CBR is less than the third threshold, the terminal may perform periodic reservation of the fourth reserved resource; otherwise, the terminal may not perform periodic reservation of the fourth reserved resource.

It should be noted that, in some implementations, if the number of resources of transmission resources in one resource period is less than or equal to the second threshold, or the CBR is less than the third threshold, the terminal may perform periodic reservation of the fourth reserved resource.

In the foregoing manner, after performing resource selection, the terminal may perform periodic reservation of the reselected resource, or may not perform periodic reservation of the reselected resource, thereby improving flexibility of resource reselection.

It should be noted that a variety of optional implementations described in this embodiment of this application may be implemented in combination with one another or separately, which is not limited in this embodiment of this application.

For ease of understanding, the following provides description with reference to examples in scenario 1 and scenario 2.

Figure 2A:
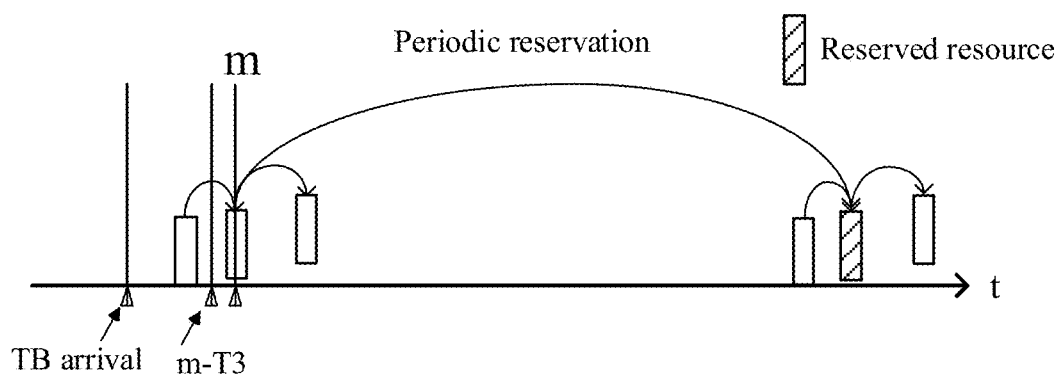
FIG. 2a is a first schematic diagram of resource transmission according to an embodiment of the present invention.

Scenario 1: In a previous resource period, the UE determines whether a reserved resource in a next resource period is preempted (that is, re-evaluation is performed on the reserved resource in the next resource period), as shown in FIG. 2a.

Figure 2B:
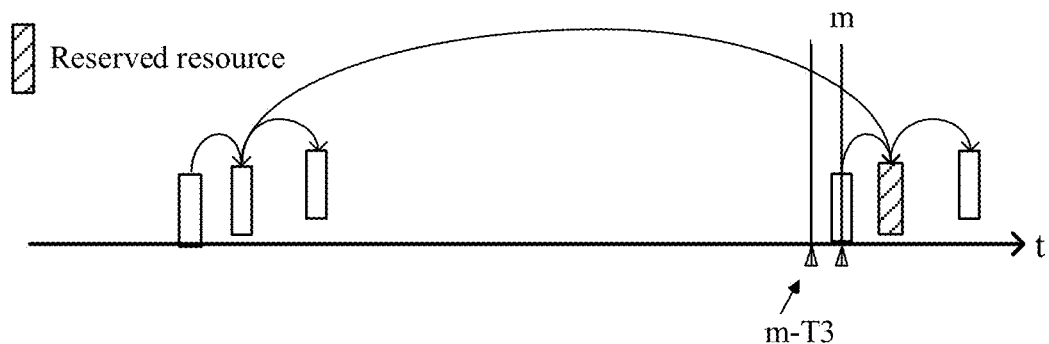
FIG. 2b is a second schematic diagram of resource transmission according to an embodiment of the present invention.

Scenario 2: When a reserved resource in a resource period has no corresponding TB transmission, the UE performs re-evaluation on the reserved resource, as shown in FIG. 2b.

Solution 1: This solution is applicable to scenario 1, and describes how to perform re-evaluation on a periodically reserved resource.

(1) For a TB transmission, a transmission resource (PSCCH/PSSCH resource) corresponding to a time point m requires resource selection evaluation to be performed at a time point 'm—T3' (reselection is allowed after evaluation), and a resource reserved at the time point m also requires resource selection evaluation (reselection is allowed after evaluation), where the reserved resource includes at least one of the following:

evaluation is performed only on an aperiodically reserved resource; and evaluation is performed on both a periodically reserved resource and an aperiodically reserved resource.

In addition, whether to perform evaluation on a periodically reserved resource may depend on a reservation period being less than a threshold, and the threshold may be at least defined, configured by the control node, or preconfigured.

(2) Resource selection evaluation is performed on a periodically reserved resource for determining (that is, determining in the current period whether a resource in a subsequent period is preempted).

An assumption of a TB transmitted on the periodically reserved resource is that:

a characteristic (or part of the characteristics) of the TB is the same as a characteristic (or part of the characteristics) of a TB transmitted in the current period, for example, a PSSCH/PSCCH mapping priority of the TB, a PDB characteristic of the TB, or the like; or a characteristic (or part of the characteristics) of the TB is a characteristic specified by the protocol, configured, or preconfigured, where, for example, the PSSCH/PSCCH mapping priority of the TB is a maximum value, a minimum value, or a (pre)configured value; and the PDB characteristic of the TB is a fixed value or a (pre)configured value.

(3) If it is determined that the periodically reserved resource requires resource reselection, at least one of the following actions is performed:

reselecting a corresponding resource of the current period;

skipping, in the current period, reserving the resource that requires resource reselection (that is, a resource reservation period of the SCI is set to 0); and releasing an SL process that requires resource reselection.

Solution 2: This solution is applicable to scenario 2, and describes how to perform re-evaluation on a periodically reserved resource.

(1) For a transmission resource (PSCCH/PSSCH resource) located at a time point m, a condition for resource selection evaluation at a time point 'm—T3' (or, a condition for reselection after evaluation) is:
- that a TB transmission is present at a time no later than the time point 'm—T3' (that is, TB arrival is no later than the time point m—T3).

(2) If no TB transmission is present on a current reserved resource, the UE also performs resource selection evaluation.

An assumption of the TB transmission is that:
- a characteristic (or part of the characteristics) of the TB is the same as a characteristic (or part of the characteristics) of a TB last transmitted, for example, a PSSCH/PSCCH mapping priority of the TB, a PDB characteristic of the TB, or the like;
- a characteristic (or part of the characteristics) of the TB is the same as a characteristic (or part of the characteristics) of a TB last transmitted in the SL process, for example, a PSSCH/PSCCH mapping priority of the TB, a PDB characteristic of the TB, or the like; or
- a characteristic (or part of the characteristics) of the TB is a characteristic specified by the protocol, configured, or preconfigured, where for example, the PSSCH/PSCCH mapping priority of the TB is a maximum value, a minimum value, or a (pre)configured value, and the PDB characteristic of the TB is a fixed value or a (pre)configured value.

(3) If it is determined that the reserved resource requires resource reselection,
- a resource that requires reselection in this case is released; and
- the SL process that requires resource reselection is released.

Solution 3: This solution describes whether periodic reservation is allowed for a reselected resource, to resolve a problem of resource over-reservation.

During evaluation on resource preemption, if resource selection has been performed on the transmission resource (PSCCH/PSSCH resource) in the current period based on a re-evaluation result, whether the reselected resource requires periodic reservation is determined in the following manners:
- the UE determines whether to perform periodic reservation, that is, periodic reservation being allowed;
- if periodic reservation is performed, the number of resources in one (or more) next period is not greater than an allowed maximum value or a maximum value (the maximum value may be limited per pool/BWP) of the number of allowed transmissions for one TB; otherwise, periodic reservation is not performed; and
- the CBR is less than a threshold; otherwise, periodic reservation is not performed, where the threshold is specified by the protocol, configured, or preconfigured.

This embodiment of this application describes how to perform re-evaluation on the periodically reserved resource, and describes behavior restrictions on periodic reservation of the reselected resource, that is, describing a behavior or condition for re-evaluation on the periodically reserved resource and a method for periodic reservation of the reselected resource. This resolves a problem that the UE cannot determine or cannot accurately determine whether the reserved resource has been actually preempted, and resolves a problem of resource over-reservation.

It should be noted that, according to the resource processing method provided in this embodiment of this application, an execution body may be a resource processing apparatus or a control module for executing the resource processing method in the resource processing apparatus. In this embodiment of this application, the resource processing method being executed by the resource processing apparatus is used as an example to describe the resource processing apparatus provided in this embodiment of this application.

Figure 3:
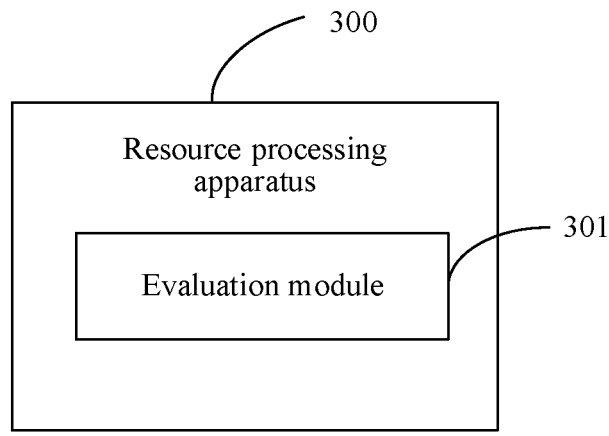
FIG. 3 is a structural diagram of a resource processing apparatus according to an embodiment of the present invention.

Referring to FIG. 3, FIG. 3 is a structural diagram of a resource processing apparatus according to an embodiment of the present invention. As shown in FIG. 3, the resource processing apparatus 300 includes:
- an evaluation module 301, configured to perform re-evaluation on a target resource at a first time point, where the target resource includes at least one of the following:
  - a first reserved resource corresponding to a second time point;
  - a second reserved resource indicated by first resource reservation information; and
  - a third reserved resource indicated by the first resource reservation information; where
  - the first resource reservation information is to be sent at the second time point, the first time point is before the second time point, the second reserved resource is an aperiodic resource, and the third reserved resource is a resource within a resource period of a periodic resource.

Optionally, a resource period of the third reserved resource is less than or equal to a first threshold, and the first threshold is specified by a protocol, configured by a control node, or preconfigured by the terminal.

Optionally, it is assumed that a characteristic of a first transport block TB to be transmitted on the third reserved resource is the same as a characteristic of a second TB to be transmitted on the first reserved resource; or it is assumed that the characteristic of the first TB is predetermined by a protocol, configured by a control node, or preconfigured by the terminal.

Optionally, in a case that the target resource includes the first reserved resource, the evaluation module 301 is specifically configured to:
- perform re-evaluation on the target resource at the first time point in a case that a first condition is satisfied, where the first condition being satisfied includes any one of the following:
  - that the terminal has a to-be-transmitted TB at the first time point;
  - that the terminal has a to-be-transmitted TB before the first time point; and
  - that the terminal has no to-be-transmitted TB on the first reserved resource; where
  - the to-be-transmitted TB is a TB configured to be transmitted on the first reserved resource.

Optionally, in a case that the first condition being satisfied includes that the terminal has no to-be-transmitted TB on the first reserved resource:
- it is assumed that a characteristic of a third TB to be transmitted on the first reserved resource is the same as a characteristic of a fourth TB; or it is assumed that the characteristic of the third TB is specified by a protocol, configured by a control node, or preconfigured by the terminal; where
- the fourth TB satisfies at least one of the following: the fourth TB and the third TB belong to a same sidelink process, and the fourth TB is a TB prior to the third TB.

Optionally, a characteristic of a TB includes at least one of the following: a resource mapping priority of the TB and a packet delay budget PDB of the TB.

Optionally, the resource processing apparatus 300 further includes:

a first operation module, configured to perform a first operation in a case that an evaluation result of the re-evaluation is resource reselection being required for the third reserved resource, where the first operation includes any one of the following:

reselecting a periodic resource to which the third reserved resource belongs;

reselecting all periodic resources included in a first sidelink process;

prohibiting reservation of the third reserved resource in the first reserved resource; and releasing the first sidelink process; where the first sidelink process is a sidelink process to which the third reserved resource belongs.

Optionally, the resource processing apparatus 300 further includes:

a second operation module, configured to perform a second operation in a case that an evaluation result of the re-evaluation is resource reselection being required for the first reserved resource, where the second operation includes any one of the following:

releasing the first reserved resource; and releasing a sidelink process to which the first reserved resource belongs.

Optionally, the resource processing apparatus 300 further includes:

a reselection module, configured to: in a case that an evaluation result of the re-evaluation is resource reselection being required for the target resource, perform resource re-selection to obtain a fourth reserved resource; and a judgment module, configured to determine, according to a first rule, whether to perform periodic reservation of the fourth reserved resource, where the first rule includes at least one of the following:

whether to perform periodic reservation of a reselected resource is determined by the terminal; and whether to perform periodic reservation of a reselected resource is determined based on a second condition, where in a case that the second condition is satisfied, periodic reservation of a reselected resource is performed, and the second condition being satisfied includes at least one of the following: that the number of resources of transmission resources in one resource period is less than or equal to a second threshold, where the second threshold is a maximum number of resources allowed in a resource period or a maximum number of transmissions allowed for one TB; and that a channel busy ratio CBR is less than a third threshold, where the third threshold is specified by a protocol, configured by a control node, or preconfigured by the terminal.

The resource processing apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal listed above, and the non-mobile terminal may be a server, a network attached storage (NAS), a personal computer (PC), a television (TV), a teller machine, a self-service machine, or the like, which is not specifically limited in this embodiment of this application.

The resource processing apparatus in this embodiment of this application may be an apparatus with an operating system. The operating system may be an Android operating system, an iOS operating system, or other possible operating systems, and is not specifically limited in the embodiments of this application.

The resource processing apparatus provided in this embodiment of this application can implement the processes implemented in the method embodiment in FIG. 1, with the same technical effects achieved. To avoid repetition, details are not described herein again.

Figure 4:
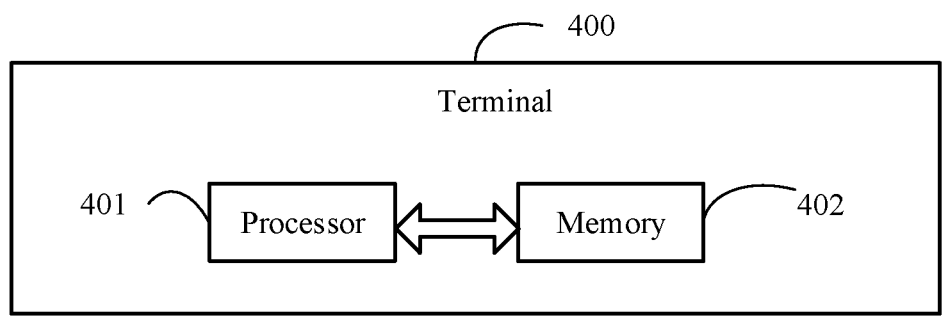
FIG. 4 is a first structural diagram of a terminal according to an embodiment of the present invention.

Optionally, as shown in FIG. 4, an embodiment of this application further provides a terminal 400, including a processor 401, a memory 402, and a program or an instruction stored in the memory 402 and capable of running on the processor 401. When the program or the instruction is executed by the processor 401, the processes of the foregoing embodiment of the resource processing method are implemented, with the same technical effects achieved. To avoid repetition, details are not described herein again.

Figure 5:
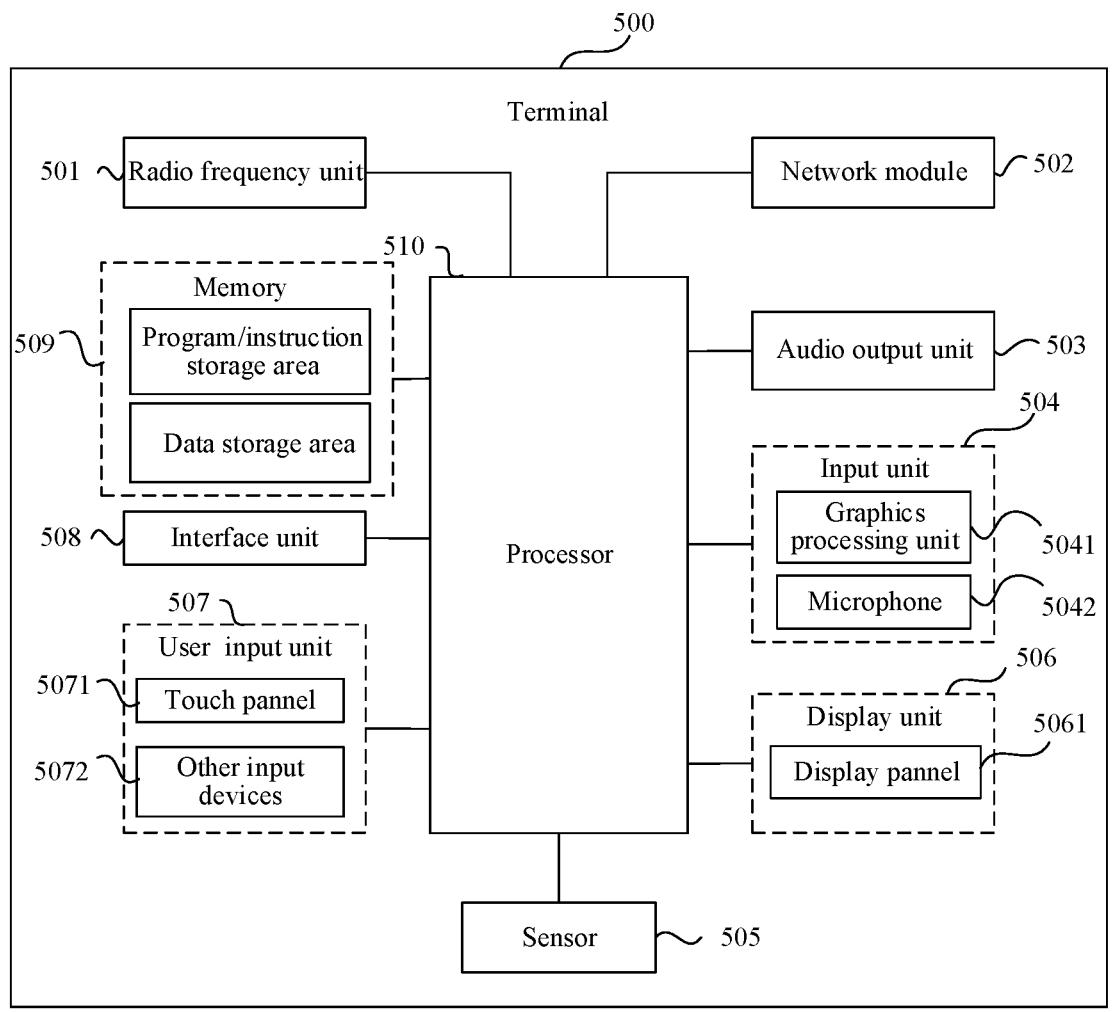
FIG. 5 is a second structural diagram of a terminal according to an embodiment of the present invention.

FIG. 5 is a second structural diagram of a terminal according to an embodiment of the present invention. The terminal may be a schematic diagram of a hardware structure of a terminal that implements the embodiments of the present invention. The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art can understand that the terminal 500 may further include a power supply (for example, a battery) supplying power to the components, and the power supply may be logically connected to the processor 510 through a power management system. In this way, functions such as charge management, discharge management, and power consumption management are implemented by using the power management system. The structure of the terminal shown in FIG. 5 does not constitute any limitation on the terminal. The terminal may include more or fewer components than those shown in FIG. 5, or a combination of some components, or the components disposed differently. Details are not repeated herein.

It can be understood that in this embodiment of this application, the input unit 504 may include a graphics processing unit (GPU) 5041 and a microphone 5042. The graphics processing unit 5041 processes image data of a still picture or video obtained by an image capture apparatus (such as a camera) in a video capture mode or an image capture mode. The display unit 506 may include a display panel 5061, and the display panel 5061 may be configured in a form of a liquid crystal display, an organic light-emitting diode, and the like. The user input unit 507 may include a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function key (such as a volume control key or a power on/off key), a trackball, a mouse, a joystick, and the like. Details are not described herein.

In this embodiment of this application, the radio frequency unit 501 receives downlink data from a network-side device, and then sends the downlink data to the processor 510 for processing; and also sends uplink data to the network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may include a program or instruction storage area and a data storage area. The program or instruction storage area may store an operating system, an application program or instruction required by at least one function (for example, a sound playback function or an image playback function), and the like. In addition, the memory 509 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 510 may include one or more processing units. Optionally, an application processor and a modem processor may be integrated in the processor 510. The application processor primarily processes an operating system, user interfaces, application programs or instructions, and the like. The modem processor primarily processes radio communication, for example, being a baseband processor. It can be understood that the modem processor may alternatively be not integrated in the processor 510.

The processor 510 is configured to:
perform re-evaluation on a target resource at a first time point, where the target resource includes at least one of the following:
a first reserved resource corresponding to a second time point;
a second reserved resource indicated by first resource reservation information; and
a third reserved resource indicated by the first resource reservation information; where
the first resource reservation information is to be sent at the second time point, the first time point is before the second time point, the second reserved resource is an aperiodic resource, and the third reserved resource is a resource within a resource period of a periodic resource.

Optionally, a resource period of the third reserved resource is less than or equal to a first threshold, and the first threshold is specified by a protocol, configured by a control node, or preconfigured by the terminal.

Optionally, it is assumed that a characteristic of a first transport block TB to be transmitted on the third reserved resource is the same as a characteristic of a second TB to be transmitted on the first reserved resource; or it is assumed that the characteristic of the first TB is predetermined by a protocol, configured by a control node, or preconfigured by the terminal.

Optionally, in a case that the target resource includes the first reserved resource, the processor 510 is further configured to:
perform re-evaluation on the target resource at the first time point in a case that a first condition is satisfied, where the first condition being satisfied includes any one of the following:
that the terminal has a to-be-transmitted TB at the first time point;
that the terminal has a to-be-transmitted TB before the first time point; and
that the terminal has no to-be-transmitted TB on the first reserved resource; where
the to-be-transmitted TB is a TB configured to be transmitted on the first reserved resource.

Optionally, in a case that the first condition being satisfied includes that the terminal has no to-be-transmitted TB on the first reserved resource:
it is assumed that a characteristic of a third TB to be transmitted on the first reserved resource is the same as a characteristic of a fourth TB; or it is assumed that the characteristic of the third TB is specified by a protocol, configured by a control node, or preconfigured by the terminal; where
the fourth TB satisfies at least one of the following: the fourth TB and the third TB belong to a same sidelink process, and the fourth TB is a TB prior to the third TB.

Optionally, a characteristic of a TB includes at least one of the following: a resource mapping priority of the TB and a packet delay budget PDB of the TB.

Optionally, the processor 510 is further configured to:
perform a first operation in a case that an evaluation result of the re-evaluation is resource reselection being required for the third reserved resource, where the first operation includes any one of the following:
reselecting a periodic resource to which the third reserved resource belongs;
reselecting all periodic resources included in a first sidelink process;
prohibiting reservation of the third reserved resource in the first reserved resource; and
releasing the first sidelink process; where the first sidelink process is a sidelink process to which the third reserved resource belongs.

Optionally, the processor 510 is further configured to:
perform a second operation in a case that an evaluation result of the re-evaluation is resource reselection being required for the first reserved resource, where the second operation includes any one of the following:
releasing the first reserved resource; and
releasing a sidelink process to which the first reserved resource belongs.

Optionally, the processor 510 is further configured to:
in a case that an evaluation result of the re-evaluation is resource reselection being required for the target resource, perform resource re-selection to obtain a fourth reserved resource; and
determine, according to a first rule, whether to perform periodic reservation of the fourth reserved resource, where the first rule includes at least one of the following:
whether to perform periodic reservation of a reselected resource is determined by the terminal; and
whether to perform periodic reservation of a reselected resource is determined based on a second condition, where in a case that the second condition is satisfied, periodic reservation of a reselected resource is performed, and the second condition being satisfied includes at least one of the following: that the number of resources of transmission resources in one resource period is less than or equal to a second threshold, where the second threshold is a maximum number of resources allowed in a resource period or a maximum number of transmissions allowed for one TB; and that a channel busy ratio CBR is less than a third threshold, where the third threshold is specified by a protocol, configured by a control node, or preconfigured by the terminal.

It should be noted that the terminal 100 in this embodiment is capable of implementing the processes of the method embodiment in the embodiments of the present invention, with the same beneficial effects achieved. To avoid repetition, details are not described herein again.

An embodiment of this application further provides a readable storage medium, where a program or an instruction is stored in the readable storage medium. When the program or the instruction is executed by a processor, the processes of the foregoing embodiment of the resource processing method can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or an instruction of a network device to implement the processes of the foregoing resource processing method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

It may be understood that the embodiments described in this application may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A resource processing method, performed by a terminal, wherein the method comprises:
    performing re-evaluation on a target resource at a first time point, wherein the target resource comprises at least one of the following:
    a first reserved resource corresponding to a second time point;
    a second reserved resource indicated by first resource reservation information; or
    a third reserved resource indicated by the first resource reservation information; wherein
    the first resource reservation information is to be sent at the second time point, the first time point is before the second time point, the second reserved resource is an aperiodic resource, and the third reserved resource is a resource within a resource period of a periodic resource,
    wherein in a case that the target resource comprises the first reserved resource, the performing re-evaluation on a target resource at a first time point comprises:
    performing re-evaluation on the target resource at the first time point in a case that a first condition is satisfied, wherein the first condition being satisfied comprises any one of the following:
    that the terminal has a to-be-transmitted TB at the first time point;
    that the terminal has a to-be-transmitted TB before the first time point; or
    that the terminal has no to-be-transmitted TB on the first reserved resource; wherein
    the to-be-transmitted TB is a TB configured to be transmitted on the first reserved resource.

2. The method according to claim 1, wherein a resource period of the third reserved resource is less than or equal to a first threshold, and the first threshold is specified by a protocol, configured by a control node, or preconfigured by the terminal.

3. The method according to claim 1, wherein a characteristic of a first transport block TB to be transmitted on the third reserved resource is the same as a characteristic of a second TB to be transmitted on the first reserved resource; or the characteristic of the first TB is predetermined by a protocol, configured by a control node, or preconfigured by the terminal.

4. The method according to claim 1, wherein in a case that the first condition being satisfied comprises that the terminal has no to-be-transmitted TB on the first reserved resource:

a characteristic of a third TB to be transmitted on the first reserved resource is the same as a characteristic of a fourth TB; or the characteristic of the third TB is specified by a protocol, configured by a control node, or preconfigured by the terminal; wherein the fourth TB satisfies at least one of the following: the fourth TB and the third TB belong to a same sidelink process, or the fourth TB is a TB prior to the third TB.

5. The method according to claim 3, wherein a characteristic of a TB comprises at least one of the following: a resource mapping priority of the TB or a packet delay budget PDB of the TB.

6. The method according to claim 1, wherein after the performing re-evaluation on a target resource at a first time point, the method further comprises:

performing a first operation in a case that an evaluation result of the re-evaluation is resource reselection being required for the third reserved resource, wherein the first operation comprises any one of the following:

reselecting a periodic resource to which the third reserved resource belongs;

reselecting all periodic resources comprised in a first sidelink process;

prohibiting reservation of the third reserved resource in the first reserved resource; or releasing the first sidelink process; wherein the first sidelink process is a sidelink process to which the third reserved resource belongs.

7. The method according to claim 1, wherein after the performing re-evaluation on a target resource at a first time point, the method further comprises:

performing a second operation in a case that an evaluation result of the re-evaluation is resource reselection being required for the first reserved resource, wherein the second operation comprises any one of the following:

releasing the first reserved resource; or releasing a sidelink process to which the first reserved resource belongs.

8. The method according to claim 1, wherein after the performing re-evaluation on a target resource at a first time point, the method further comprises:

in a case that an evaluation result of the re-evaluation is resource reselection being required for the target resource, performing resource re-selection to obtain a fourth reserved resource; and determining, according to a first rule, whether to perform periodic reservation of the fourth reserved resource, wherein the first rule comprises at least one of the following:

whether to perform periodic reservation of a reselected resource is determined by the terminal; or whether to perform periodic reservation of a reselected resource is determined based on a second condition, wherein in a case that the second condition is satisfied, periodic reservation of a reselected resource is performed, and the second condition being satisfied comprises at least one of the following: that the number of resources of transmission resources in one resource period is less than or equal to a second threshold, wherein the second threshold is a maximum number of resources allowed in a resource period or a maximum number of transmissions allowed for one TB; or that a channel busy ratio CBR is less than a third threshold, wherein the third threshold is specified by a protocol, configured by a control node, or preconfigured by the terminal.

9. A terminal, comprising a processor, a memory, and a program or an instruction stored in the memory and capable of running on the processor, wherein when executing the program or the instruction, the processor is configured to:

perform re-evaluation on a target resource at a first time point, wherein the target resource comprises at least one of the following:

a first reserved resource corresponding to a second time point;

a second reserved resource indicated by first resource reservation information; or a third reserved resource indicated by the first resource reservation information; wherein the first resource reservation information is to be sent at the second time point, the first time point is before the second time point, the second reserved resource is an aperiodic resource, and the third reserved resource is a resource within a resource period of a periodic resource, wherein in a case that the target resource comprises the first reserved resource, the processor is specifically configured to:

perform re-evaluation on the target resource at the first time point in a case that a first condition is satisfied, wherein the first condition being satisfied comprises any one of the following:

that the terminal has a to-be-transmitted TB at the first time point;

that the terminal has a to-be-transmitted TB before the first time point; or that the terminal has no to-be-transmitted TB on the first reserved resource; wherein the to-be-transmitted TB is a TB configured to be transmitted on the first reserved resource.

10. The terminal according to claim 9, wherein a resource period of the third reserved resource is less than or equal to a first threshold, and the first threshold is specified by a protocol, configured by a control node, or preconfigured by the terminal.

11. The terminal according to claim 9, wherein a characteristic of a first transport block TB to be transmitted on the third reserved resource is the same as a characteristic of a second TB to be transmitted on the first reserved resource; or the characteristic of the first TB is predetermined by a protocol, configured by a control node, or preconfigured by the terminal.

12. The terminal according to claim 9, wherein in a case that the first condition being satisfied comprises that the terminal has no to-be-transmitted TB on the first reserved resource:

a characteristic of a third TB to be transmitted on the first reserved resource is the same as a characteristic of a fourth TB; or the characteristic of the third TB is specified by a protocol, configured by a control node, or preconfigured by the terminal; wherein the fourth TB satisfies at least one of the following: the fourth TB and the third TB belong to a same sidelink process, or the fourth TB is a TB prior to the third TB.

13. The terminal according to claim 11, wherein a characteristic of a TB comprises at least one of the following: a resource mapping priority of the TB or a packet delay budget PDB of the TB.

14. The terminal according to claim 9, wherein the processor is further configured to perform a first operation in a case that an evaluation result of the re-evaluation is resource reselection being required for the third reserved resource, wherein the first operation comprises any one of the following:
    reselecting a periodic resource to which the third reserved resource belongs;
    reselecting all periodic resources comprised in a first sidelink process;
    prohibiting reservation of the third reserved resource in the first reserved resource; or
    releasing the first sidelink process; wherein
    the first sidelink process is a sidelink process to which the third reserved resource belongs.

15. The terminal according to claim 9, wherein the processor is further configured to:
    perform a second operation in a case that an evaluation result of the re-evaluation is resource reselection being required for the first reserved resource, wherein the second operation comprises any one of the following:
    releasing the first reserved resource; or
    releasing a sidelink process to which the first reserved resource belongs.

16. The terminal according to claim 9, wherein the processor is further configured to:
    in a case that an evaluation result of the re-evaluation is resource reselection being required for the target resource, perform resource re-selection to obtain a fourth reserved resource; and
    determine, according to a first rule, whether to perform periodic reservation of the fourth reserved resource, wherein the first rule comprises at least one of the following:
    whether to perform periodic reservation of a reselected resource is determined by the terminal; or
    whether to perform periodic reservation of a reselected resource is determined based on a second condition, wherein in a case that the second condition is satisfied, periodic reservation of a reselected resource is performed, and the second condition being satisfied comprises at least one of the following: that the number of resources of transmission resources in one resource period is less than or equal to a second threshold, wherein the second threshold is a maximum number of resources allowed in a resource period or a maximum number of transmissions allowed for one TB; or that a channel busy ratio CBR is less than a third threshold, wherein the third threshold is specified by a protocol, configured by a control node, or preconfigured by the terminal.

17. A non-transitory readable storage medium, wherein the readable storage medium stores a program or an instruction, and the program or the instruction, when being executed by a processor, causes the processor to perform re-evaluation on a target resource at a first time point, wherein the target resource comprises at least one of the following:
    a first reserved resource corresponding to a second time point;
    a second reserved resource indicated by first resource reservation information; or
    a third reserved resource indicated by the first resource reservation information; wherein
    the first resource reservation information is to be sent at the second time point, the first time point is before the second time point, the second reserved resource is an aperiodic resource, and the third reserved resource is a resource within a resource period of a periodic resource,
    wherein the program or the instruction, when being executed by a processor, specifically causes the processor to:
    in a case that the target resource comprises the first reserved resource, perform re-evaluation on the target resource at the first time point in a case that a first condition is satisfied, wherein the first condition being satisfied comprises any one of the following:
    that the terminal has a to-be-transmitted TB at the first time point;
    that the terminal has a to-be-transmitted TB before the first time point; or
    that the terminal has no to-be-transmitted TB on the first reserved resource; wherein
    the to-be-transmitted TB is a TB configured to be transmitted on the first reserved resource.

* * * * *